June 13, 1967 W. L. LINN 3,324,840
ROTARY TYPE ENGINE
Filed Jan. 16, 1967 2 Sheets-Sheet 1

INVENTOR
WALLACE L. LINN
BY
ATTORNEY

June 13, 1967  W. L. LINN  3,324,840
ROTARY TYPE ENGINE

Filed Jan. 16, 1967  2 Sheets-Sheet 2

INVENTOR
WALLACE L. LINN
BY
Robert Jennie
ATTORNEY

United States Patent Office 3,324,840
Patented June 13, 1967

3,324,840
ROTARY TYPE ENGINE
Wallace L. Linn, Indianapolis, Ind., assignor to P. R. Mallory & Co. Inc., Indianapolis, Ind., a corporation of Delaware
Filed Jan. 16, 1967, Ser. No. 609,377
5 Claims. (Cl. 123—16)

ABSTRACT OF THE DISCLOSURE

Connecting rods are used to connect the crankshaft to the rotor. Cooperating notches and wedges synchroinze the ring means carrying the connecting rods with the rotor.

Two rotors of the type described in Patent No. 3,301,233 are held in tandem on a single shaft in a single chamber to form two engine sections, one being the compressor section, the other being the power section.

---

This application is related to application Ser. No. 424,105, filed Jan. 7, 1965, and now Patent No. 3,301,233.

The present invention relates to an internal combustion engine, more particularly to a rotary internal combustion engine. The rotary internal combustion engine includes several novel means and methods such as continuous firing of an explosive fuel and air mixture in an explosion space thereby eliminating the need for a continuous spark or a continuous ignition system, vanes that ride in close proximity to an inner periphery of a cylinder, and slotted portions formed in the inner periphery of the cylinder to obtain a more advantageous mixture of fuel and air, combustion of the fuel and air mixture in a decompression portion of a firing cycle to thereby obtain a cooler running engine without sacrifice of horsepower developed by the novel rotary internal combustion engine, and a ring means and bearing means cooperatively associated with each individual vane to predeterminately locate the vane with respect to the inner wall of the cylinder to thereby substantially reduce wear.

Rotary internal combustion engines are known and are successfully utilized to provide a driving means for tools, machines and any other types of machinery that demand a uniform and a constant output of energy in order to be efficiently actuated. The rotary internal combustion engine may be utilized as a means for propelling automotive means and would necessarily be equipped with a suitable transmission. Within the broad field of rotary internal combustion engines, the need exists for a light weight engine that is cooler running than is the conventional rotary internal combustion engine; the need exists for an internal combustion engine that eliminates the need for a means that develops a continuous ignition spark; and the need exists whereby the internal wear of the rotary internal combustion engine is substantially reduced thereby promoting greater engine efficiency and longer engine life.

Several presently available rotary internal combustion engines include vane means that engage with the cylinder wall thereby increasing wear at the point or points of engagement. Typically, these engines include a continuous spark ignition system, for each pair of vanes substantially seal their associated portion of a circular cylinder. Several of the presently available rotary internal combustion engines ignite the fuel and air mixture during the compression portion of the cycle whereas the present invention provides a means for igniting the fuel and air mixture during the decompression portion of the cycle thereby allowing the engine of the present invention to operate at a substantially cooler temperature without any substantial sacrifice in power developed by the engine. It is seen that the present invention provides a simple, effective, and efficient rotary internal combustion engine. By the accompanying drawings and specification, the novel means and method whereby the present invention fulfills the required purposes will be disclosed.

Therefore, it is an object of the present invention to provide a rotary internal combustion engine wherein the combustion of a fuel and air mixture occurs during a decompression portion of a cycle.

Another object of the present invention is to provide a rotary internal combustion engine including means wherein a plurality of vanes have their respective extremities retained in close proximity to but not engaging with an inner wall of a cylinder.

Still another object of the present invention is to provide a rotary internal combustion engine including means wherein the fuel and air mixture is more uniformly mixed to provide a mixture having more advantageous combustion characteristics.

Yet another object of the present invention is to provide a rotary internal combustion engine wherein the need for a continuous timing spark to ignite a fuel and air mixture is eliminated.

Another object of the present invention is to provide a novel rotary internal combustion engine having optimum reliability characteristics afforded by a compact construction having a minimum number of parts.

Still another object of the present invention is to provide a rotary internal combustion engine in which the radial movement of a plurality of vanes is more positively effected.

A further object of the present invention is to provide a rotary internal combustion engine having provision for adequate lubrication thereby maintaining the motor substantially cool.

Yet another object of the present invention is to provide a rotary internal combustion engine having a plurality of vanes in an elliptical working chamber having the characteristic of economy.

Another object of the present invention is to provide a rotary internal combustion engine having increased structural strength which substantially eliminates the stresses and strains encountered with the reciprocating internal combustion engine.

Still another object of the present invention is to provide a rotary internal combustion engine having increased serviceability characteristics and having a minimum number of moving parts.

Yet another object of the present invention is to provide a rotary internal combustion engien that requires a small amount of fuel and air mixture for the output power produced and that produces little vibration while operating.

Still another object of the present invention is to provide a simple, efficient, and practical rotary internal combustion engine.

Yet another object of the present invention is to provide a rotary internal combustion engine having an outlet means and a vacuum exhaust means for vacuum scavenging a residue of a combusted mixture present within the engine.

Still another object of the present invention is to provide a rotary internal combustion engine including a synchronizing means for synchronizing the rotational displacement of a rotor means and associated ring and vanes.

Yet still another object of the present invention is to provide a rotary internal combustion engine wherein the rotor vanes are rotatably journalled to the crank shaft through ring means carrying connecting rods.

Still another object of the invention is to provide a rotary internal combustion engine wherein cooperating notches and wedges synchronize the ring means carrying the connecting rods with the rotor.

Another object of the invention is to provide a rotary internal combustion engine wherein two rotors are held in tandem on the crank shaft in two elliptical working chambers to form two engine sections.

Still another object of the present invention is to provide a rotary internal combustion engine having two engine sections wherein one section serves as the compressor and the other serves as the power section.

The present invention in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended calims, and appended drawings. The invention resides in the novel combination, arrangement and cooperation of elements as hereinafter described and more particularly as defined in the appended claims.

The appended drawings illustrate the preferred embodiments of the present invention constructed to function in the most advantageous modes devised for the practical application of the basic principles involved in the hereinafter described invention.

Figure 1:
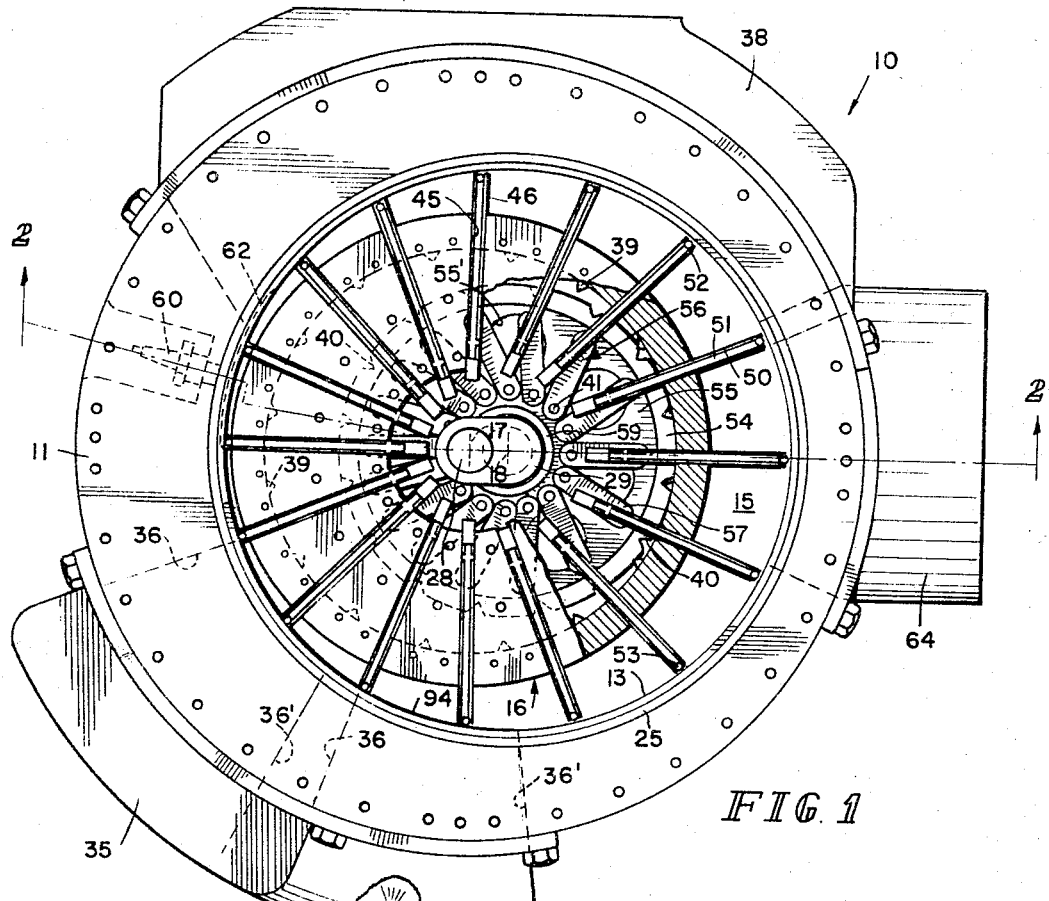
FIGURE 1 is a top view of the novel rotary internal combustion motor with sections thereof partially cut away wherein the top view illustrates the various parts of the engine and their cooperative relationship to other parts of the engine.

The present invention described means for continuously igniting an air-fuel mixture in which a continuous spark system becomes unnecessary. In the present system the constant firing is done in the explosion chamber and includes vacuum type of exhaust mechanism for scavenging the exhaust gases. The explosion chamber forms a separate engine section, the compressor section being the other section with both sections being part of a single work chamber.

Functionally and constructively in each section bearing surfaces cooperate with vanes through connecting rods and by so doing are predeterminately positioned in relationship to the inner wall of the cylinder forming the work chamber. Further the invention discloses an engine having a stationary singly overhung crank. As a result thereof, the driveshaft of the engine is directly coupled to the sealing means closing either extremity of the engine. Additionally by the construction and novel cooperation of the components of the engine and since the engine fires on the decompression portion of the firing cycle, a cooler operation of the engine is afforded without sacrifice of power.

Generally speaking, the means and method of the present invention relates to a novel rotary internal combustion engine. The engine includes a hollow cylindrical means having an elliptical shaped inner wall. The axis of the inner wall is eccentric with the cylindrical means. A stationary single overhung crank means includes a crankshaft means moutned eccentrically in the cylindrical means and an offset portion thereof if mounted concentrically in the cylindrical means. A rotor means is mounted concentrically in the cylindrical means so that the rotor means has as its axis, the axis of the offset portion of the crank means. A plurality of sealing means are fixedly connected to ends of the rotor means so that a sealing means overlies each extremity of the cylindrical means. A work chamber is formed by the cooperative relationship of the rotor means and the inner wall. The work chamber is effectively divided into two sections with each section divided into several spaces including a compression space, a decompression space, an explosion space, an expansion space, and an exhaust space. Each section carries the rotor means. A plurality of spaced radial slots are carried by the rotor means. Vanes are slidably carried in the radial slots, the vanes including tips. A means is rotatably journalled to the crankshaft for maintaining the tips of the vanes predeterminately spaced from the inner wall. Interfitting with the tip of each of the vanes is a tubing means which rides in close proxmity to the inner wall to thereby effectively prevent gas from leaking between the inner wall and the tip of the vane. An inlet means communicates with the compression space formed by one of the sections thereby allowing air to enter the compression space through the inlet means. The air is compressed by rotational displacement of the rotor means and cooperatively associated vanes. The air then passes through passage means to the outer section which acts as the power section where it mixes with a mixture of fuel. Rotational displacement of the rotor means and the cooperatively associated vanes causes the air-fuel mixture to be slightly decompressed and ignited. A plurality of arcuate slots are preferably formed in the inner wall for maintaining continuous ignition of the explosive mixture within the explosion space. The ignited mixture expands into the expansion space against an increased surface area of the vanes thereby causing additional rotational displacement of the rotor and said cooperatively associated vanes. An outlet means and a vacuum exhaust means communicate with the exhaust space for vacuum scavenging a residue of the mixture present within the exhaust space.

The present invention utilizes a ring means rotatably journalled to the crankshaft for maintaining the tips of the vanes predeterminately spaced from the inner wall. The ring means includes rod means pivotally coupling the plurality of vanes to the ring means. Means are also included for synchronizing the rotational displacement of the rotor means and the ring means.

Figure 2:
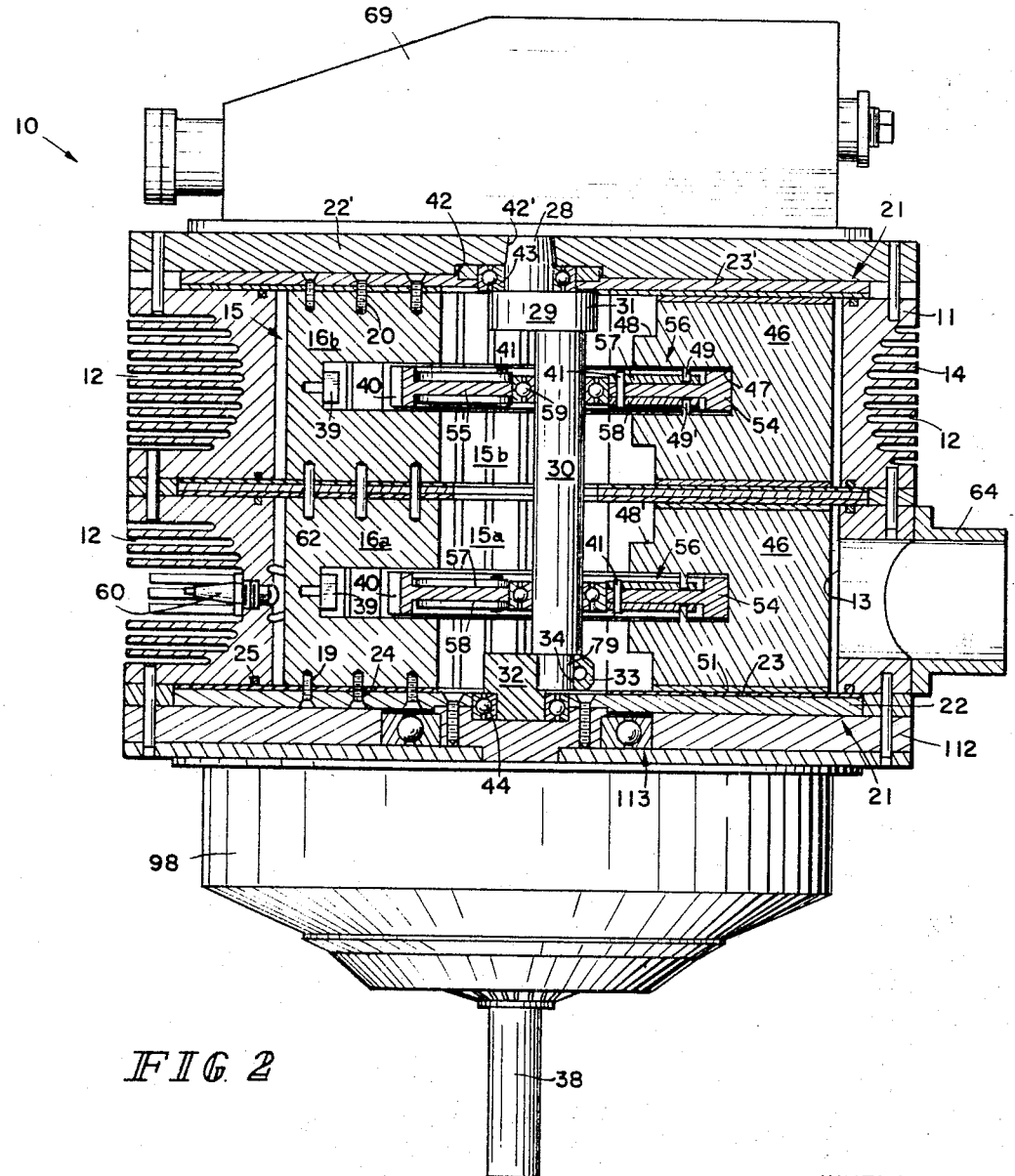
FIGURE 2 is a cross section taken along line 2—2 of FIGURE 1.

Referring now to the drawings, which illustrate the preferred embodiments of the present invention, the rotary internal combustion engine is generally indicated by numeral 10. The engine is suitably mounted on a support member as illustrated in FIGURE 2 by utilizing any acceptable and conventional manner such as mounting means 112. The engine includes an apertured, cylindrical shaped means 11 fabricated from a suitable metal or metal alloy capable of withstanding high temperatures and having good wear resistance such as an alloy metal sold under the trademark Mallory 3, or specially treated aluminum, or the like. The cylindrical means has a plurality of slots 12 formed therein extending from the outermost peripheral surface of the cylindrical means to a point near the inner wall 13 of the cylindrical means. A plurality of air cooling fins 14 are formed by the plurality of slots 12 on the outer periphery of cylindrical means. It is seen that the plurality of air cooling fins provide a means and method whereby the amount of surface area of the cylindrical means exposed to air is significantly increased thereby allowing increased heat dissipation of heat generated during the operation of the engine.

The inner wall 13 of the cylindrical means is formed so as to be slightly elliptical in shape for reasons discussed herein, later. The inner wall has a lining 94 of suitable wear and heat resistant metal such as stainless steel. A work chamber 15 is formed by the inner wall 13 of the cylindrical means and the periphery of rotor means 16. Rotatably mounted within the elliptical space of the cylindrical means are first and second rotor means 16a and 16b. The rotor means rotates about axis 17 which is offset from axis 18 of the inner wall and which is the axis of a plurality of vanes 46. The offset of the aforementioned axis is in an eccentric manner. The rotor means has formed therein a plurality of threaded recesses 19 parallel to but spaced from the axis of the rotor means. The threaded recesses receive therein a plurality of fastening bolts 20. A sealing means 21 is located at each extremity of the cylindrical means thereby effectively enclosing the extremities of the cylindrical means. The sealing means includes a first plate 22 fabricated from any suitable metal such as aluminum or the like and an overlying second plate 23 fabricated from any suitable metal such as stainless steel or the like. Each plate has therein a plurality of apertures 24 formed therein. A bolt 20 interfits and projects through its respective aperture so as to mate with its cooperatively associated threaded recess 19. As the bolts 20 are turned into threaded recesses 19 it is seen that the sealing means becomes effectively a part of the rotor means. Thus, as the rotor means is displaced in a rotational fashion, the respective sealing means will be rotationally displaced therewith. As a direct result of fastening the sealing means to the rotor means and due to the fact that the radius of sealing means 21 is greater than the radius of the inner surface, the respective sealing means are biased against a resilient sealing ring 25 seated in the cylindrical shaped means as illustrated in FIGURE 2. A resilient sealing ring is positioned at opposite ends of the cylindrical means. The rings are fabricated from any suitable resilient material such as cast iron or the like.

The respective sealing rings are utilized to effectively prevent undesirable foreign matter such as gases or dirt or other deleterious matter from entering the working chamber and also to provide a controlled condition under which combustion of a fuel and air mixture takes place.

As disclosed hereinbefore, the rotary internal combustion engine provides a means and method of effecting compression of the fuel and air mixture, thereafter allowing slight expansion of the compressed gases, igniting and exploding the fuel-air mixture and utilization of the expansive force generated by the exploding of the fuel and air mixture.

The axis 17 about which the rotor means rotates is formed by the axis of offset portion 28 of a stationary single overhung crank 29. The axis of crankshaft 30 provides an axis 18 about which the elliptical work chamber is formed. The offset portion of the crank and the crankshaft are fixedly coupled by web 31 to form the unitary crank. The crank is fabricated from any suitable metal such as stainless steel or the like. A seat means 32 includes a portion 33 having a recess 34 which interfits with extremity 79 of the crank shaft. Centrally aligned with axis 28 is a drive shaft 38 that is rotatably journalled to one of mounting means 112 through bearing means 113.

Offset portion 28 of the stationary crank projects through centrally located aperture 42 of plate 23' and centrally located aperture 42' of plate 22'. Plate 22' overlies plate 23'. Plate 22' is fabricated from any suitable metal such as aluminum or the like. Plate 23' is fabricated from any suitable metal such as stainless steel. Bearing 43 interfits between offset portion 28 of the crank and plate 22' so that plate 22' can rotate substantially free of the crank yet the crank provides axial support to the plate 22' and to plate 23'. Bearing 44 interfits with plate 22 so that the plate 22 and the drive shaft rotate substantially free of the seat of the crank, yet provide axial support for the drive shaft and plate 22.

A carburetor means (not shown) and a blower means 98 are fixedly coupled together by any suitable means such as a conduit. The carburetor means and the blower means are utilized to provide an adequate portion of a fuel and air mixture to the engine under an initial pressure. As will be more completely described, the partially compressed fuel and air mixture enters the combustion section 15a of the working chamber 15 of the engine through a plurality of arcuate slots (not shown) formed in the inner wall 13. In the like manner, air enters the compression section 15b of the work chamber through similar arcuate slots. The plurality of slots are each of predetermined arcuate length. The carburetor means and the blower means are fixedly coupled to the engine by any suitable fastening means such as bolts (not shown) or other appropriate fastening means.

Rotors 16a and 16b are positioned within the elliptical work chamber in an eccentric manner with respect to the longitudinal axis of the work chamber. As illustrated in FIGURE 1, the rotor has formed therein a plurality of radial slots 45. The drawings illustrate 16 radial slots but it will be understood that the number of slots may be varied without departing from the scope of the novel invention. Sixteeen radial slots have been shown as a mere matter of convenience to facilitate the description of the present invention. As shown in FIGURE 2, operatively associated with each slot in the rotor is a vane 46. The vanes slide in their respective slots in accordance with their arcuate position with respect to the inner wall. Each vane is of predetermined length and is fabricated so as to exceed the total length of its associated slot for reasons appearing hereinafter.

In the present invention, each vane is integrally fabricated from any suitable metal such as titanium, aluminum, machine steel, or the like. Referring to FIGURES 1 and 2, each vane has formed therein a recess portion 47 of predetermined extent that is centrally located at the longitudinal axis thereof. A horizontal flange 48 and a horizontal flange 48' are formed on opposite sides of the recess portion 47. Projecting from vane 46 into the recess portion 47 are vertical flanges 49 and 49'. Each vane along its uppermost and lowermost horizontal side has recessed therein a T-shaped slot 50 that extends the entire length of each side of the vane. A T-shaped means 51 fabricated from any suitable resilient metal such as stainless steel or the like, interfits with and is retained by the T-shaped slot to provide a sliding sealing means between its associated vane and plate 23 or plate 23'.

It will be observed that there is a small clearance between vertical tip 52 of the vane and the wall of the working chamber. The tips or extremities of the vanes do not engage the wall of the working chamber. A tubing 53 interfits with and is retained in place by a recess of the vane. The tubing is fabricated from any suitable material such as stainless steel or the like. The purpose of the tubing is to ride in close proximity to the inner wall to thereby effectively seal the area between the tip of the vane and the inner wall so that substantially no leakage of gases occurs through this area.

In the present invention the vanes 46 are rotatably journalled to the crankshaft 30 through bearing 59 and connecting means 56. Connecting means 56 comprises a connecting rod consisting of spaced parallel members 57 and 58. The rod is carried by ring means 55 having a flaned portion 54. The rod is pivotally connected to the ring means 55 through a pin 41 and to the vanes 46 by the flanges 49 and 49'. Ring means 55 is coupled to bearing means 59 by a press fit, for example. The vanes are thus pivotally journaled to the crankshaft in a direct and simple manner such that the rotor means with its associated vanes functions in a more reliable manner. The fact that the connecting rods are pivotally mounted reduces the tendency of the vanes to cock as the rotor revolves about the crankshaft. Such cocking of the vanes causes imbalances in the rotor thus causing excessive wear. Ring means 55 preferably has a plurality of holes 55' in order to reduce the mass of the ring.

A problem of the vanes cocking also exists when the engine deccelerates. It is seen that since the mass of the rotor is greater than the mass of the plurality of the vane means there a more rapid slow down of one of the masses than the other of the masses thereby causing the vanes to cock. With the cocking of the vane means, it is possible that the spacing would be sufficient to allow ignition of the fuel and air mixture in the counterclockwise direction thereby combusting the explosive mixture before it is compressed. To eliminate this problem a means and method were devised to synchronize the decceleration of the rotor mass and the van mass to prevent cocking of the vane means. In the present invention, the synchronizing means comprises a multiplicity of notches 40 formed in the ring means 55 and adapted to cooperatively receive a multiplicity of cooperating wedgs 39 formed in the rotor means 16. Thus the ring means 55 which carries the pivotal connecting means 56 is synchronized with the rotor so that the vanes 46 which are a part of the rotor will rotate in accordance with the rotation of the crank shaft 30. This markedly reduces the tendency for the vanes to cock upon rotation of the rotor. As a result the engine is materially strengthened thus allowing it to operate at higher r.p.m.

Due to the eccentric mounting of the rotor means within the cylindrical shaped means, the length of the vanes and the position of the rim means, it is seen that the vanes do not contact and therefore do not ride against inner wall 13 as is done in several presently available rotary internal combustion engines. The vanes ride in close proximity to the inner wall 13 thereby achieving substantially the same result as the vanes of several presently available devices without the wear experienced by these devices and without any substantial loss of power developed by the operating engine. In the combustion section 15a, the rotor is so mounted that its periphery has its closest proximity to the inner wall at a point removed about 10 degrees in a counterclockwise direction from spark plug 60. The rotor is at its furthermost point from the inner wall at a point about 180 degrees in the clockwise direction from the point of the rotor having its closest proximity to the inner wall. As disclosed hereinbefore, a plurality of arcuate slots (not shown) of predetermined length are formed in the innermost wall. The slots form an inlet means or an intake port to the work chamber from the carburetor-blower means. The arcuate slots or inlet means provide a means and method whereby an explosive mixture of fuel and air enters the work chamber between several of the vanes from the carburetor-blower means.

More particularly, air enters the compressor section 15b of work chamber 15 from blower 98 by way of inlet 38 through the arcuate slots formed in the inner wall 13 of the chamber. Clockwise rotation of rotor means 16b partially compresses the air from whence it passes to the combustion chamber 15a by way of passage means 36 and manifold 35. At manifold 35 the air mixes with fuel coming from the carburetor (not shown) through a passage 36' and inlet means 37. The fuel-air mixture then enters the combustion section 15a of the work chamber through the arcuate slots formed in the inner wall 13 of the work chamber 15. During the rotational displacement of the rotor means 16b in the clockwise direction, the fuel and air mixture is forced into the work chamber. It is noted that when proceeding in a clockwise direction, the space between the rotor means and the inner wall of the cylindrical means is tapering in nature. Therefore, as the rotor means is displaced in the clockwise direction, the appropriate vanes carry therewith the air and fuel mixture in the clockwise direction. Due to the tapering shape of the space, through which the fuel and air mixture is carried, the fuel and air mixture is compressed. The maximum compression of the fuel and air mixture is attained at about the point 10 degrees removed in the counterclockwise direction from the spark plug 60 as illustrated in FIGURE 1. Upon additional rotational displacement of the rotor means, the explosive fuel and air mixture is allowed to decompress slightly at which point ignition of the explosive mixture occurs. A pair of slots 62 formed in the inner wall at an angle each with respect to the other are equally spaced on either side of the spark plug 60 as illustrated in FIGURES 1 and 2. The slots arcuately extend about 23 degrees in both the clockwise and counterclockwise direction from the spark plug. One of the purposes of the slots 62 is to further mix the fuel air mixture by additional turbulence of the mixture. The initial ignition of the fuel is sufficient to ignite the fuel and air mixture in a continuous fashion as long as the engine is operated. This phenomenon occurs due to several factors operating in conjunction. Slots 62 are of sufficient length to overlie an area determined by at least three adjacent vanes, thereby providing at least two unimpeded channels to the areas determined by the three adjacent vanes so as to provide a means of igniting the fuel air mix associated with the areas. The design is adequate to permit continuous ignition of fuel and air mixture without the necessity of having a continuous spark ignition system. The fuel and air mixture contained behind these areas in the counterclockwise direction will not ignite for the separation between the tip of the vane and its cooperatively associated tubing and the inner wall is too small to provide an opening through which the exploding fuel and air mixture can pass to ignite the fuel and air mixture therebehind.

Formed on the inner wall 13 of combustion section 15a and communicating with venturi action exhaust means 64 is a plurality of discharge arcuate slots (not shown). The clockwise motion of the vanes sweeps the combusted fuel and air mixture from the work chamber through the discharge slots to the exhaust means. Hence, after ignition of the fuel and air mixture and its resulting expansion, the residue of the fuel and air mixture is conveyed to the venturi action exhaust means through which it passes to the atmosphere.

Although not shown, as a means and method of reducing gas leakage between the working chamber and any one or all of the radial slots 45 which carry the rotor vanes, a half ring interfits with a triangular shaped cut out portion formed in the rotor means. The cut out portion is located adjacent each longitudinal side of each vane. One half ring is located on each longitudinal side of the vane. Each half ring acts as a sealing means between the cooperatively associated vane and the rotor means to thereby prevent leakage of gases between the vanes and the radial slots of the rotor means.

A plurality of lubricating ports associated with the crankshaft 30 are coupled to oil pan 69 for proper lubrication of the engine. Through the lubricating ports lubricating oil is introduced from the oil pan to the engine. The innermost extremities of these ports transmit oil to the outermost recesses of the working chamber. Through these oil ports lubricating oil is introduced under pressure by means of an oil pump (not shown) to the recesses of the engine. As the engine is operating, the radial displacement of the vanes in their operatively associated slots in conjunction with centrifugal force present when the engine is operating, will result in the lubricating oil moving outwardly from the axis of the rotor means on both extremities thereof to both longitudinal sides of each vane. The lubricating oil will also move outwardly from the axis of the rotor to the inner of the cylindrical wall. All interior working parts of the engine will be continuously lubricated by the system of lubricating ports. Oil seals are appropriately located within the engine so as to substantially prevent oil leakage from the engine.

The electrical mechanism for electrically making and breaking the electrical circuit connected to the spark plug is not shown. As disclosed hereinbefore, the initial spark of the spark plug ignites the fuel and air mixture adjacent the spark plug, therefore, an electrical mechanism that would store a suitable charge to cause the spark plug to initiate a spark at the begininng of the operation of the engine would be sufficient. It is seen that there is no ostensible need for a continuous spark ignition means when utilizing the means of the present invention.

Having described the structure of the present invention the cooperation between the described structural elements will be disclosed.

Figures 3, 4:
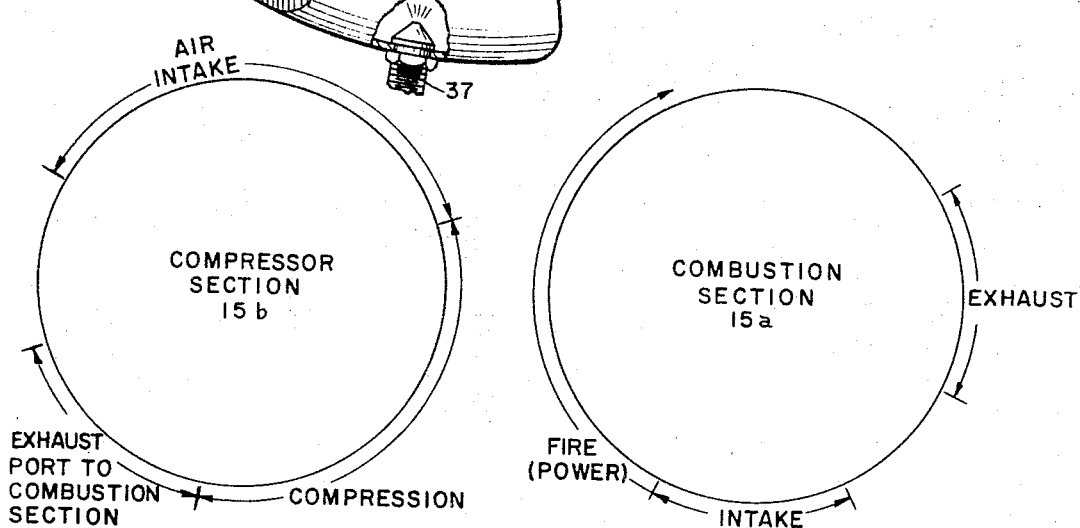
FIGURES 3 and 4 illustrate the various major portions of a cycle of the rotary internal combustion engine of the present invention.

It is seen that drive shaft is rotationally displaced in the predetermined direction as are the end plates or sealing means and the rotor means. The initial movement of the drive shaft may be imparted thereto by any suitable means such as an electric starting motor of the type commonly utilized with internal combustion engines. The initial rotational displacement of the rotor means will cause the vanes operatively associated with the rotor means to induce a directional flow of the fuel and air mixture through the arcuate intake slots from the carburetor means and through the blower means. It is seen that the the flow of the fuel and air mixture will be substantially continuous so long as the engine is operating. As the air enters the compression section of the working chamber, it will be compressed due to the tapering nature of the area located between the rotor means and the inner wall. The air is compressed between the rotor means, the inner wall and the operatively associated vanes. The compression reaches a maximum about 150 degrees from the intake slots. Thereafter the air is permitted to be conveyed to the combustion section of the work chamber where it mixes with a fuel to form a fuel-air mixture. The fuel-air mixture is permitted to expand slightly in the combustion section and at the same time the vanes carry the fuel and air mixture to the vicinity of a spark plug. At a predetermined point the spark plug is energized thereby igniting the combustible fuel and air mixture in a space called an explosion space of the combustion section of the work chamber. The combustion of the mixture causes a rapid increase in the pressure contained within this portion of the working chamber as well as an increase in the temperature of this portion of the working chamber. The expanding gases expand into and through a space called the expansion space of the combustion section. The resulting increase in pressure and temperature is in accordance with well known scientific principles. As a result of the substantially increased pressure on the vane closest to the spark plug in a determined direction, the vane is displaced in the determined direction. Decompression of the combusted fuel and air mixture takes place due to the widened area between the rotor means and the inner wall. The pressure of the combusted fuel and air mixture causes the vanes to move in the clockwise direction until such time as the combusted fuel and air mixture reaches the discharge slots where the residue of the combusted fuel and air mixture is scavenged from the working chamber. This space of the work chamber is called the exhaust space. FIGURES 3 and 4 of the drawings illustrate the approximate location of the aforementioned spaces within the engine.

In summation, the present invention described a means for continuously igniting an air-fuel mixture in which a continuous spark system becomes unnecessary. In the present system the constant firing is done in the explosion chamber and includes a vacuum type of exhaust mechanism for scavenging the exhaust gases. Addiitionally, and perhaps more important, the present invention utilizes two sections, a compressor section and a combustion section whereby more area is available for cooling and the engine becomes self-aspirating.

While the invention is illustrated and described in its preferred embodiment, it will be understood that modifications and variations may be effected without departing from the scope of the novel concepts of this invention and as set forth in the appended claims. For example, the use of the connecting means for the vanes and the synchronizing means of the rotor may be used in an engine having a single section for the work chamber as described in the above-noted parent application. Likewise the two sectioned concept of the work chamber of the present invention may be used with the connecting means for the vanes and the synchronizing means of the rotor of the parent application.

Having described the invention, what is claimed is:

1. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber being divided into two sections, a compressor section and a combustion section; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compressor section for allowing air to enter said compression space through said inlet means; said air being compressed by rotational displacement of said rotor means and said cooperatively associated vanes, passage means for passing said compressed air to said combustion section, inlet means for allowing fuel to be mixed with said air at said combustion section to form a fuel-air mixture as said air enters said combustion section, further rotational displacement of said rotor means and said cooperatively associated vanes causing said mixture to be slightly decompressed and ignited within said combustion section; said ignited mixture expanding causing additional rotational displacement of said rotor means and said cooperatively associated vanes; and an outlet means communicating with an exhaust space for scavenging a residue of said mixture present within said exhaust space.

2. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber being divided into two sections, a compressor section and a combustion section; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compressor section for allowing air mixture to enter said compression space through said inlet means, said air being compressed by rotational displacement of said rotor means and said cooperatively associated vanes, passage means for passing said compressed air to said combustion section, inlet means for allowing fuel to be mixed with said air at said combustion section to form a fuel-air mixture as said air enters said combustion section, further rotational displacement of said rotor means and said cooperatively associated vanes causing said mixture to be slightly decompressed and ignited; a plurality of arcuate slots formed in said inner wall for maintaining continuous ignition of said mixture within said combustion section, said ignited mixture expanding causing additional rotational displacement of said rotor means and said cooperatively associated vanes; and an outlet means communicating with air exhaust space for scavenging a residue of said mixture present within said exhaust space.

3. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber being divided into two sections, a compressor section and a combustion section; a plurality of spaced radial slots carried by said rotor means; vanes slidably carried in said slots, said vanes including tips; means rotatably journalled to said crank shaft for maintaining said tips of said vanes predeterminately spaced from said inner wall; an inlet means communicating with said compressor section for allowing air to enter said compression space through said inlet means, said air being compressed by rotational displacement of said rotor means and said cooperatively associated vanes, passage means for passing said compressed air to said combustion section, inlet means for allowing fuel to be mixed with said air at said combustion section to form a fuel-air mixture as said air enters said combustion section, further rotational displacement of said rotor means and said cooperatively associated vanes causing said mixture to be slightly decompressed and ignited with said combustion section; a plurality of arcuate slots formed in said inner wall for maintaining continuous ignition of said mixture within said combustion section, said ignited mixture expanding causing additional rotational displacement of said rotor means and said cooperatively associated vanes; and an outlet means communicating with an exhaust space for scavenging a residue of said mixture present within said exhaust space.

4. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means, said rotor means having as an axis an axis of said crank means; a plurality of sealing means fixedly connected to said rotor means and overlying each extremity of said cylindrical means; a work chamber formed by the cooperative relationship of said rotor means and said inner wall, said work chamber having a compression space, an explosion space and an exhaust space; a plurality of spaced radial slots carried by said rotor means; vanes slidably carried in said slots, said vanes including tips; ring means rotatably journalled to said crank means, connecting means pivotally carried by said ring means and being pivotally connected to said vanes for maintaining said tips of said vanes spaced from said inner wall; synchronizing means cooperatively associated with said ring means and said rotor means so as to synchronize the rotation of said ring and rotor means; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

5. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means, said rotor means having as an axis an axis of said crank means; a plurality of sealing means fixedly connected to said rotor means and overlying each extremity of said cylindrical means; a work chamber formed by the cooperative relationship of said rotor means and said inner wall, said work chamber having a compression space, an explosion space and an exhaust space; a plurality of spaced radial slots carried by said rotor means; vanes slidably carried in said slots, said vanes including tips; ring means rotatably journalled to said crank means, connecting rods pivotally mounted on said ring means and being pivotally connected to said vanes for maintaining said tips of said vanes spaced from said inner wall; cooperating notches and wedges formed respectively on said ring means and said rotor means so as to synchronize the rotation of said ring and rotor means; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

References Cited

UNITED STATES PATENTS

| | | | |
|---|---|---|---|
| 1,427,692 | 8/1922 | Mahon | 123—16 |
| 2,193,178 | 3/1940 | Laythorpe | 123—16 |

MARK NEWMAN, *Primary Examiner.*

RALPH D. BLAKESLEE, *Examiner.*